(12) United States Patent
White

(10) Patent No.: US 6,990,277 B2
(45) Date of Patent: Jan. 24, 2006

(54) ENHANCED MULTIMODE FIBER

(75) Inventor: Ian A. White, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 215 days.

(21) Appl. No.: 10/408,076

(22) Filed: Apr. 4, 2003

(65) Prior Publication Data

US 2004/0202423 A1 Oct. 14, 2004

(51) Int. Cl.
*G02B 6/16* (2006.01)

(52) U.S. Cl. .......................... 385/39; 385/123; 385/128; 385/141; 385/142; 385/145

(58) Field of Classification Search ................... 385/39, 385/123–128, 141–145
See application file for complete search history.

(56) References Cited

U.S. PATENT DOCUMENTS

| | | | |
|---|---|---|---|
| 3,909,110 A | | 9/1975 | Marcuse |
| 3,966,446 A | | 6/1976 | Miller |
| 4,038,062 A | | 7/1977 | Presby |
| 4,176,911 A | * | 12/1979 | Marcatili et al. ........... 385/124 |
| 6,751,390 B2 | * | 6/2004 | Qi et al. ...................... 385/127 |
| 2003/0161597 A1 | * | 8/2003 | Berkey et al. .............. 385/123 |

* cited by examiner

*Primary Examiner*—John R. Lee
*Assistant Examiner*—Zia R. Hashmi

(57) ABSTRACT

A perturbed, multimode optical fiber exhibits order-of-magnitude improved capacity attributed to mode mixing—high per-channel bit rate, and large channel number due to large available bandwidth—without the added loss which, in the past, was associated with the perturbation stream.

18 Claims, 5 Drawing Sheets

ENHANCED MULTIMODE FIBER

FIELD OF THE INVENTION

Optical fiber communications.

BACKGROUND OF THE INVENTION

Initial enthusiasm with optical fiber, when first introduced, was soon dampened by a number of considerations. Importantly, early fiber structures—of core size sufficient to support many modes of light—were unexpectedly capacity-limited. It was found that pulse repetition rate in such fiber was limited by pulse spreading, which could obliterate the unoccupied pulse positions that represented the information content of the pulse stream. Laser-generated pulses, single-mode as introduced, were found to have significant higher-mode content as received, with differing modal group velocities accounting for the observed pulse spreading. Intense effort was unsuccessful in avoiding fiber imperfections—e.g., the scattering centers—which had been identified as a primary cause responsible for mode conversion and, accordingly, for generation of the higher-order modes.

A promising remedy was suggested by S. E. Miller. As described in his U.S. Pat. No. 3,966,446, Jun. 29, 1976, a multitude of "perturbations" in composition were to be made along the length of the fiber. The objective was an introduction of localized abrupt changes in index-of-refraction, to serve as additional mode conversion centers. The intent was to increase incidence of mode conversion to an extent that all modal groups, upon arrival, would have undergone many mode-to-mode transformations during transit, thereby "averaging" group velocities, narrowing pulse width, and retrieving lost information capacity. Miller's work, in which he perturbed the preform glass along its length by changing dopant content, thereby producing corresponding index variations in the drawn fiber, confirmed expectation, and others continued the effort.

H. M. Presby, U.S. Pat. No. 4,038,062, Jul. 26, 1977, is illustrative of further work directed to mode-mixing. That patent teaches use of a pulsating heat source that plays directly on the fiber as it is drawn from the preform, thereby periodically varying axial alignment and/or diameter, and, in this manner, introducing controlled periodic index fluctuations, as "seen" by the signal.

However, while mode coupling had the desired effect of increasing bandwidth, it was invariably accompanied by increased power loss, and commercialization was limited. Today's state-of-the-art multimode fiber systems continue to use unperturbed fiber.

Recognizing the added fiber loss to be due to increased coupling between (supported) core modes and (unsupported) cladding modes—an unwanted effect accompanying the (wanted) increased coupling between core modes—fiber structures, restricting induced coupling to core modes, were considered. Two approaches, together, illustrate the intensity of the effort and the sophistication of the reasoning entailed in the effort to design a fiber that would enjoy the advantage of mode-mixing without the cost penalty of increased loss.

U.S. Pat. No. 3,909,110, issued to Dietrich Marcuse on Sep. 30, 1975, makes use of an inherent property of multimode fiber for differentiating between core modes and cladding modes in step-index fiber. Recognizing that positions of high field intensity, associated with successively higher-order modes, lie at successively increased radial spacing from the fiber axis, the inventor would now be enabled to selectively couple (lower-order) modes. This he sought to do by localizing perturbation-index changes on or near fiber axis where the fields of the lower-order bound modes are concentrated. Unfortunately, while lessening coupling efficiency for higher-order modes in this manner, mode mixing with still non-zero fields on or near-axis continued, with associated unacceptable added loss.

U.S. Pat. No. 4,176,911, issued to Marcatili et al. on Dec. 4, 1979, describes an effort to avoid the added loss associated with mode mixing in the parabolic-index core, multimode fiber structure, which was gaining favor over the step-index structure with which Marcuse was concerned. The parabolic (or "alpha") profile tends to equalize transit times for the various modes, thereby contributing to pulse-narrowing, and continues to be favored to this day. Unfortunately, to the extent that profiling accomplishes this purpose, it tends also to equalize radial spacings between successively higher order mode pairs. This, in turn, tends to equalize coupling probability for all core modes and eliminates the inherent differentiation offered by step-index fiber. The inventive solution was a departure from the usual "matched clad", in which the index-v-radius parabolic profiling of the core was continued, without interruption, into the cladding. Instead, the invention provided for a core-cladding "mismatch"—for an abrupt index decrease at the core-cladding interface, resulting in a cladding of index value markedly less than attained in the core—for the purpose of separating core and cladding modes. The well-reasoned approach reduced—but did not sufficiently eliminate—added loss.

Interest in multimode fiber design waned with commercial introduction of single-mode fiber—with its fiber core supporting only the fundamental mode, and, so, avoiding mode dispersion altogether. Advancing technology had enabled manufacture of fiber structures with the needed degree of control for making cores of the necessary 1–6 $\mu$m radius. (State-of-the-art, silica-based multimode fiber is characteristically of core radius of at least 25 $\mu$m—common designs have 50 $\mu$m or 62.5 $\mu$m cores.) Single-mode fiber continues to dominate the all-important long distance communication market.

The fiber art has made impressive advances. Low-loss dopants/doping processes, for tailoring index-of-refraction and imparting wanted light-guiding properties, have been developed. Intractability of the high-melting, and easily-contaminated, silica-based fiber has yielded to a number of suitable manufacturing processes, which maintain product within extremely tight compositional, dimensional, and purity specifications.

Common manufacturing processes are: Modified Chemical Vapor Deposition, and the "soot" processes—Outside Vapor Deposition and Vapor Axial Deposition. As described in *Optical Fiber Telecommunications*, S. E. Miller and A. G. Chynoweth, 1979, Academic Press, in Chapter 8, all of these processes react gaseous silicon halide-containing material with oxygen, to produce initial, silica-containing, particulate material of carefully-controlled composition, which, as consolidated, yields at least the critical core portion of the preform from which the fiber is ultimately drawn. MCVD and OVD achieve critical core profiling by means of layer-by-layer, longitudinal deposition of thin layers of material of differing-composition—of material containing varying kind and/or amount of index-increasing or index-decreasing, dopant. VAD depends on "end-on" deposition of material of radially graded composition for profiling. Preform preparation may entail further processing such as etch-removal of temporary substrate—of the enclosing MCVD deposition tube or the enclosed OVD mandrel. Resulting hollow MCVD and OVD bodies are subsequently collapsed to yield the preform from which the fiber is drawn. MCVD manufacture lends itself to a cost-reducing procedure, by which the consolidated body is placed within an outer cladding tube of less critical, relatively inexpensive material, to produce the (now composite) preform.

Other process characteristics may require attention both by designer and manufacturer. The high-temperature, preform collapse of both MCVD and VAD, may result in some "burnout" of index-increasing dopant and in a consequent "central dip" of reduced index-of-refraction along the fiber axis. Multiple torch passes for layered deposition generally result in some "outgassing" of more-volatile dopant at layer interfaces, and in consequent "profile ripple".

Single-mode fiber and systems, in retaining dominance, have undergone many iterations. Dispersion-Shifted Fiber eliminated chromatic dispersion at the operating wavelength, thereby avoiding what was regarded as the remaining cause of pulse-broadening in single-mode systems. Such DSF was, in turn, superseded by Non-Zero Dispersion Fiber, providing for reduced but well-controlled finite values of chromatic dispersion, to permit high bit-rate, individual-channel operation while, at the same time, enabling high-capacity, multi-channel ("Wavelength Division Multiplex") systems. Such NZDF provides an appropriate balance between: (a) low values of chromatic dispersion commensurate with high, per-channel bit-rate, and (b) needed chromatic dispersion for lessening the effect of 4-photon mixing (4PM)—a nonlinear dispersion mechanism introduced in WDM operation, and causing a type of channel-to-channel "cross talk". (Total absence of chromatic dispersion in DSF eliminated periodic phase cancellation, thereby permitting unlimited buildup of spurious signal and precluding the increased capacities expected from multi-channel operation. Operation with a trillion bit/sec capacity on a single NZDF fiber has been demonstrated.)

Multimode fiber has, however, maintained a niche position for use for shorter-distance communication. This is due, in part, to commercial unavailability of single mode fiber suitable for operation in the 800–900 nm wavelength range traditionally used in such systems. Replacement of such multimode fiber by the 1310 nm or 1550 nm single-mode fiber used in long distance systems, requires replacement of terminal equipment, and is costly. Other cost considerations favoring multimode fiber systems are: lower packaging costs for optoelectronic sources and detectors; and lower interconnection costs for fiber splices and connectors.

Multimode fiber has also retained a significant presence in "private networks"—in local area networks (LANs)—where the very high bandwidth offered by single-mode fiber has not been an issue.

Technological advance has benefited multimode fiber to some extent. Incidence of scattering centers has been lowered to the extent that associated loss in regularly produced fiber—multimode as well as single-mode—has been reduced by a factor of 4, to a value below 0.5 dB/km. In multimode fiber serving as mode-conversion centers, this is accompanied by some lessening of pulse-spreading. Further, the alpha-profiled core of state-of-the-art multimode fiber reduces velocity differences for supported modes, also lessening pulse-spreading.

Industry concentration on single-mode fiber and systems has, however, resulted in significantly increased fiber capacity—in large part, evidenced by improvements in Dense Wavelength Division Multiplexing. At the same time, desire for increased LAN system capacity has grown. As a result, that niche position, for so long held by multimode fiber on basis of cost considerations, is threatened. Many expect next-generation LANs to be single-mode.

SUMMARY OF THE INVENTION

The invention is a perturbed multimode fiber of improved information capacity—permitting both greater per-channel bit-rate and more effective channel multiplexing. The advance may be viewed as satisfaction of the long-sought remedy for the "added loss" that has prevented industry acceptance of perturbed fiber.

Following earlier work, the invention first appreciates the role played by a stepped core-cladding interface—whether of step-index fiber or of unmatched profiled fiber—in decreasing probability of unwanted coupling by providing for a relatively large change in effective index, $\Delta n_{eff}$, as between highest bound mode and lowest cladding mode.

The inventive departure identifies the inherent limitation of that earlier work—limitation aggravated by the very interface responsible for decreasing that coupling probability. Positioning of that interface overlooked the fundamental nature of that "highest bound mode"—overlooked the fact that it was a grouping. While effectively preventing conversion of the primary member of the highest-order bound mode group, the core-cladding interface permits coupling other group members.

The inventive solution is provision of such a $\Delta n_{eff}$-increasing interface within the core—at a position sufficiently spaced from the cladding to assuredly capture other members of that highest-order bound mode group. At the same time, the new core-core interface is not sufficiently spaced from the core-cladding interface as to defeat the intended purpose of the fiber perturbations—the mixing of lower-order core modes. The desire is accomplished by placement of that core-core interface within a range of radius spacings from the fiber axis including that of 70% of the entirety of the core radius.

The intent is accomplished by provision of a compositional "functional discontinuity" within the core and making that core-core interface with enclosed material at the desired spacing from the cladding. Fiber structures of the invention are described as containing two core parts: an inner, α-profile, first core part; together with an enclosing second core part, constituting the discontinuity, preferably of stepped interface at its junction with the enclosed first part. The enclosing second core part is nominally annular, and interfaces with the first part at radius of from 50% to 80% of that of the total core. That enclosing (second) core part is, in its entirety, constituted of material of lesser index-of-refraction than that of material that would result from extrapolation of the α-profile of the enclosed part. As so constituted, fiber is now found to be of significantly reduced "added loss" ascribed to unwanted mode mixing with cladding modes. Claims concern preferred as well as alternate structures, e.g., specifying preferred location and extent of the discontinuity, and calling for structures including a third core part enclosing the first and second core parts.

The invention finally realizes the bit-rate advantage expected of perturbation-induced mode-mixing in a real fiber and, in so doing, enables wider operating bandwidth, in turn, promising larger Coarse Wavelength Division Multiplexed channel sets. Such multimode CWDM systems, in LAN, rival single-mode DWDM.

BRIEF DESCRIPTION OF THE DRAWINGS

FIG. 1 shows a fiber profile representative of state-of-the-art "α=2" multimode fiber.

FIGS. 2–4 relate to the inventive EMF fiber. All include an inner core portion of α=2 profile for ease of comparison. For purposes of illustration, all include a cladding of nominally constant index-of-refraction, consistent with usual practice;

FIG. 2 shows a fiber having a 2-portion core, with discontinuity constituting an outer core portion, also of α=2 profile. The structure shown is denoted "Type A" since all index values of the discontinuity are greater than that of the cladding;

FIG. 3 shows a fiber of "Type A" 3-portion core, with constant-index discontinuity included in or serving as second core portion;

FIG. 4 shows a "Type B" fiber structure, of the general form of FIG. 3, but with index-of-refraction of the second portion attaining a value equal to or less than that of, the predominant cladding index;

Figure 1:
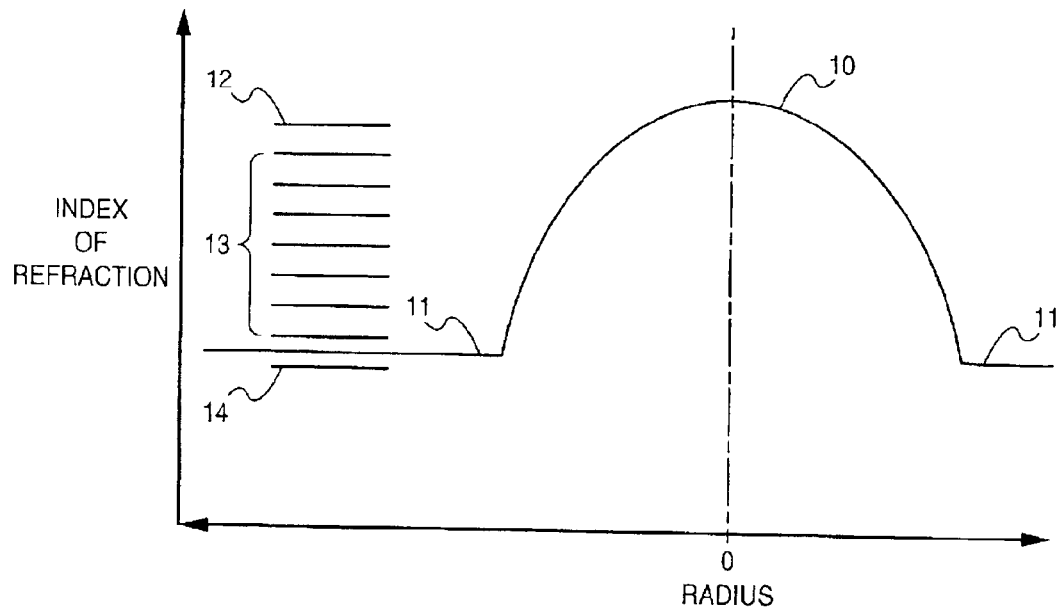
FIGS. 1–4 relate modal behavior to fiber design as relevant to the inventive teaching. Each is constituted of: a cross-sectional fiber profile on coordinates of index-of-refraction as a function of radial position; together with an accompanying diagram depicting related values of effective index ($n_{\mathit{eff}}$), for modes of light traversing the fiber.

TERMINOLOGY (Terms, always consistent with such terms as commonly used in context of optical fiber, are sometimes more specific than in common usage.)

EMF—("Enhanced Multimode Fiber")—Designation for the inventive multimode optical fiber—containing a core with a radially-positioned discontinuity, which, since invariably here viewed as relative to enclosed core portion, is of reduced index, and may, accordingly, be referred to as a "negative discontinuity".

Mode—Independent, self-supporting, electromagnetic field, constituted of an electric field component and a magnetic field component, that propagates axially along the optical fiber independent of all other modes. Generally-intended linearly-polarized modes are identified in accordance with the convention, $LP_{mn}$, in which "m" is the azimuthal mode number and "n" is the radial mode number.

Consistent with common practice, "mode", is sometimes used as synonymous with "mode group" where suitable, e.g., where phase-velocity is described and modal members of the group are of the same phase-velocity. Unless otherwise specified, the term includes both polarizations.

Mode Group (or Grouping)—Generally refers to "degenerate" mode group, also known as "principal" mode group (next definition).

Degenerate (or Principal) Mode Group (or Grouping)—For all but the single-member fundamental mode group, constituted of separate member modes, initially of the same axial phase velocity—the term is also applied to such groupings after "splitting", in which member modal phase velocities are no longer the same. Groupings are constituted of a meridional and/or helical mode, together with one or more skew modes.

Perturbation—Change in fiber characteristic that locally alters effective refractive index of concerned mode(s) from that in immediately preceding and succeeding fiber length, thereby provoking mode coupling—without modifier, referring to deliberately introduced change. Study of perturbations—those constituting change in composition as well as geometry—is at an advanced level, and is reported in "Optical Waveguide Theory", A. W. Snyder and J. D. Love, chapter 18—Chapman Hall, 1983.

Continuous relationship—A relationship, between the magnitude of a value and the position at which the magnitude is measured, in which the value at a first position has a smooth, predictable, unique (and mathematical) relationship to the value at a second position, thereby, by definition, avoiding an abrupt change in value. Used in this description, with reference to the relationship between index-of-refraction and radial position in a region of the EMF core, "continuous relationship" is descriptive of an inner core region, i.e., of near-two alpha profile, which is terminated by, and accordingly which precludes inclusion of, a "discontinuity", as defined below.

Excepting the on-axis index depressions characteristic of MCVD and OVD, present manufacture permits core index values that vary from those prescribed by the continuous relationship by up to 1% Δ over any radial distance ≦1 μm. This constitutes a preferred embodiment of the present invention.

Discontinuity (or "Profile Discontinuity")—Radially positioned, nominally annular region within the fiber core, bounded by a pronounced ("step") change, i.e., a change of at least 5% Δ, occurring over a radial distance ≦2 μm at its interface with enclosed fiber, further in which index-of-refraction is at least 5% Δ below that prescribed by extrapolation of the continuous relationship between refractive index and radial position of enclosed inner fiber. The invention-contemplated discontinuity is properly referred to as a "negative discontinuity" since constituted of material of lower value of refractive index than that prescribed by extrapolation of the (continuous) relationship between refractive index and radial position for enclosed core material.

Multimode Fiber—Fiber of core size sufficient to support a plurality of bound modes—characteristically from several hundred to 2000 modes—in addition to the fundamental mode.

Group Index—Derivative of β with respect to k (with k=2π/λ, in which λ is wavelength as measured in free space).

Mode Coupling—Conversion of one mode to another. Unless otherwise indicated, coupling between two bound modes is contemplated.

Core—Innermost region of the fiber with primary responsibility for guiding—for the most part, constituted of material of greater index of refraction than that of the cladding within which it is enclosed. In a common structure, using silica-based fiber, a core of updoped material (of material containing dopant that increases its index-of-refraction) is enclosed within a cladding of constant, lower index than that at any radial position within the core. Characteristic fiber structures consist of a germania-doped silica core within a cladding of undoped silica.

The radial dimension of the core is ordinarily considered to be the dimension from the center of the fiber to the radially-measured onset of material of index equal to or less than that of the outer cladding—i.e., of index equal to or less than the "predominant cladding index", $n_{cl}$. The core of a species of the inventive fiber—the "Type B" species—however, includes a negative core portion of index level as low as, or lower than, the predominant index of the cladding. In such structures, that second core portion is enclosed within additional core material of index greater than that of the cladding.

The primary class of fiber structures contemplated has core radius of at least 15 μm.

Step Index (stepped interface)—Defining an interface, such as the core-core interface, constituted of an index change of at least 5% Δ, occurring over a radial distance ≦2 μm.

Δ (or Fiber Delta)—A measure of the guide strength of the fiber, in accordance with:

$$\Delta = (n_{co}^{max} - n_{cl})/n_{co}^{max} \qquad \text{Eq. 1:}$$

in which:

$n_{co}^{max}$=maximum refractive index in the core, $n_{cl}$=predominant refractive index of the cladding Members of the primary class of fiber structures contemplated have Δ values characteristically within the range of 0.7–4.0%.

α Profile—Power law profile for equalizing phase velocities of bound modes—which as defining the fiber core, follows the relationship:

$$n^2(r) = (n_{co}^{max})^2 (1 - 2\Delta \cdot (r/a)^\alpha) \qquad \text{Eq. 2:}$$

in which:

n(r)=refractive index at radial position, r r=radial position as measured from the fiber axis $n_{co}^{max}$=maximum value of refractive index in the core $\Delta = (n_{co}^{max} - n_{cl})/n_{co}^{max}$ a=core radius Numerical value of two for exponent, α, is, for many purposes optimal, since assuring equal group velocity for affected modal groups, as well as equal mixing probability for successive mode pairs under its influence. The second consideration is of primary interest. Such an "α=2" profile is generally preferred.

Consistent with common design practice, discussion is in terms of the mathematically precise, prototypical, α profile, which is only approached in real structures. The following two definitions quantify encountered deviations that may be tolerated while still, to significant extent, realizing fiber properties associated with the prototypical profile. Accordingly, requirement for "α profile", as used herein, is satisfied by profiles within the bounds of "Best Fit α Profile", while requirement for "α=2" profile is satisfied if within the expanded scope permitted by "Near-2 α Profile" and by "Best Fit α Profile" as well.

Best Fit α Profile—Idealized α profile most closely approximating the actual profile, while disregarding minor deviations from Eq. 2, e.g., as unintentionally introduced during fabrication. (If such deviations are small compared to the operating system wavelength, as is often true of the "ripples" associated with the layered deposition of MCVD and OVD, guidance and transmission properties determined using "best fit" are generally accepted by system designers as descriptive of operation. By the same token, the "central dip"—the axial region of lowered index associated with MCVD and OVD, while likely of more severe index reduction, has substantial effect only on the fundamental mode, so that the "best fit", ignoring the dip, offers a valid approximation for fiber design/operation.) Ignoring the central dip, core profiles with all index values±2.5% Δ of a mathematically perfect a profile qualify for description by "best fit".

Mathematical methods for determining best fit α profile are described in A. H. Cherin, *An Introduction to Optical Fibers*, 1983, McGraw Hill, Chapter 8, Section 8, p. 208.

Near-2α Profile—Power law profile of general form approximating that defined under "α profile", in which the value of the exponent, α, approaches 2, resulting in substantial improvement in lessening differences in modal group phase velocities relative to those in constant-index cores. For purposes of this description, this art-accepted term requires an exponent value in the range, 1.5–3.0 (with limits coinciding with extreme group velocity deviation of ±1%).

Cladding—The entirety of the fiber outside the core, excluding applied protective coatings—as in conventional terminology, referring to the glass cladding produced as consequence of fiber drawing from the preform.

Outer Cladding—Without further modifier, the outermost part of the cladding and, generally, the major part of the fiber mass. In a usual instance of silica-based fiber using updoped core material (e.g., germania-doped silica), the outer cladding is undoped silica. While often of lesser index than that of any part of the core, contemplated structures may deviate. (See FIG. 4 discussion of "Type B" structures as well as comments under "Best fit α profile" and "Core".) Its value of refractive index generally serves as basis for the delta ("Δ") values used as a measure of fiber guiding strength.

DETAILED DESCRIPTION

EMF requires a "negative discontinuity"—a discontinuity attaining a value of index-of-refraction lower than that dictated by extension of the continuous relationship of the first core portion. The discontinuity constitutes a second core portion of the EMF structure. It may be profiled, e.g., as shown in the two-portion structure of FIG. 2; it may be of constant index, e.g., as shown in the three-portion structures of FIG. 3 and FIG. 4.

In either event, the second core portion is defined as constituted in its entirety of material of index-of-refraction values that are at least 5% Δ lower than extrapolated values prescribed by extension of the index-v-radius profile of the first core portion. To assure capture of a substantial fraction of the members of a bound modal grouping to be decoupled, it is required that the radial breadth of the second core portion be at least 20% of that of the entire core, i.e., at least 20% a. It is required that the first core portion be of radial dimension within the range of 50–80% a—the greater value to permit placement of the core-core interface at a sufficient distance from the core-cladding interface for effective decoupling, the lesser value for assurance of mode-mixing of a substantial fraction of the signal. It follows that the second core portion, i.e., the "discontinuity," must be of radial dimension within the range of 20–50% a.

Any third core portion constitutes the remainder of the core, i.e., a breadth maximum of 30% a. Function is discussed in description of FIGS. 3 and 4.

In the expectation that EMF will continue to serve over the 800–900 μm wavelength range commonly assigned to multimode fiber, wavelength-dependent values, unless otherwise specified, are determined at a wavelength of 850 μm as measured for radiation in free space. Similarly, deviations in index extending for distance of less than 850 μm in the measurement direction are ignored.

Fiber containing regularly spaced, deliberately-introduced, successive geometric perturbations are contemplated. Particularly as meeting the claim requirements of co-pending patent application "High-Capacity Multimode Optical Fiber Systems" (Ser. No. 10/407,410, filed on even date herewith and assigned to the assignee of this application), such perturbations may be of small magnitude, so as to have little significant effect on scattering loss while, at the same time, through repetition, assuring effective mode coupling.

It is convenient to discuss the inventive fiber in terms of "Type A" and "Type B" structures. In the former, the depressed index of the discontinuity is never as low as the predominant cladding index; in the latter, it attains a value equal to or less than that of the predominant cladding index. To assure the inventive requirement of separated core-core and core-cladding interfaces, Type B structures require a third core portion.

Other Loss Considerations

It is desirable that EMF meet specifications required of multimode fiber that it is to replace. Fortunately, design modifications defining the new fiber do not deleteriously impact significant loss requirements, possibly offering opportunity for improvement.

Microbending loss sensitivity is of primary consequence for its contribution to cabling-induced loss. Such loss, $L_{cable}$, as induced in multimode, alpha profile, fiber, is known to follow the relationship:

$$L_{cable} \propto \Gamma^{\kappa} \text{ with } \kappa \sim 6 \qquad \text{Eq. 3:}$$

in which:

$\Gamma = \{(2\Delta)^{0.5}/a\}$ a=core radius

General preference for "Design 1" fiber, commonly used in intra-building LANs, is due to its low cabling loss. This is an α=2 design with nominal parameters: Δ=2.0% and core radius a=31.25 μm, yielding a value of Γ=0.0064. Use of Design 1 fiber results in twofold cabling loss improvement, as compared with the competing "Design 2", which is of nominal parameters: Δ=1.0%, a=25.00 μm, with Γ=0.00566. It is preferred design practice to maintain Γ at least equal to that of the Design 1 (Γ≧0.0064), for prospective fiber, as qualification for cabling loss performance.

Fundamental Considerations

The parameter, Γ, is a direct indication of the difference in effective index, $\Delta n_{eff}$, between adjacent mode groups:

$$\Delta n_{eff} = \Gamma/(2\pi/\lambda) \qquad \text{Eq. 4:}$$

where the effective index of a mode, $n_{eff} = \beta/(2\pi/\lambda)$ in which, β=axial propagation constant.

The axial period of fiber perturbations, Λ, determines which modes couple (determines the magnitude of $\Delta n_{eff}$ values, and thereby of modes, eligible for coupling)—with decreasing period corresponding with larger values of $\Delta n_{eff}$:

$$(2\pi/\Lambda) = \delta\beta = \{(2\pi/\lambda)\Delta n_{eff}\} = \Gamma. \qquad \text{Eq. 5:}$$

It is of interest to note here that for α-profile multimode fiber, the critical coupling period, Γ, is dependent only on radius and delta, and not on wavelength—accordingly, the coupling process, if physically enabled for one wavelength, is equally enabled for all wavelengths.

When this mode coupling continues for extended lengths along the fiber axis, the power is ultimately coupled to all modes eligible for coupling—to all modes separated from neighbor modes by appropriate value of $\Delta n_{eff}$. Since in α=2 profile fiber, members of all mode pairs have equal coupling probability, any bound-mode coupling ultimately results in coupling to a cladding mode, and in consequent radiation loss. (Decreasing value of $\Delta n_{eff}$ is accompanied by more rapid power transfer between modes, in turn, translating into higher cabling loss. Rephrased, since $1/\Lambda = \Delta n_{eff}/\lambda$, and $\Delta n_{eff} = \Gamma/(2\pi/\lambda)$, with $\Gamma = \{(2\Delta)^{0.5}/a\}$, added fiber loss initiated by coupling increases with increasing Λ, i.e., increases with decreasing value of the ratio Γ)

The invention breaks the succession by decoupling members of a pair of bound mode groups, as discussed. This is accomplished by significantly increasing effective index spacing, $\Delta n_{eff}$ between the members of that pair to a larger value, both as compared with lower-order pairs and with the value corresponding with perturbation-spacings.

Preferentially, increasing $\Delta n_{eff}$ for the mode pair to be decoupled follows principles contained in Maxwell's Classical Electromagnetic Wave Theory of Light, see A. W. Snyder and J. D. Love, *Optical Waveguide Theory*, Chapman Hall (1983), beginning at p. 376. In terms of the "ray optical trajectories" approximation, different optical paths for the various modes within the waveguide are properly viewed as occupying different guide regions, so that field concentrations within the guide for different modes are different. See *Optical Fiber Splice and Connectors—Theory and Methods*, Chapter 2, C. M. Miller, S. C. Mettler, I. A. White, (Marcel Dekker, 1986). Both explanations are consistent with observation—both describe radial regions within which a mode may be viewed as "spending" most if its time. Location of an appropriately sized index change in such a radial region affects this mode's effective index more than all others, and may result in selective "decoupling". The magnitude of the effective index change can be determined from classical electromagnetic and ray theory perturbation methods. See, e.g., A. W. Snyder and J. D. Love, *Optical Waveguide Theory*, Chapman Hall (1983).

An alternative means of quantifying the desired index profile is understood from the electromagnetic theory of index perturbations, whereby the change, $\delta(\beta^2_{mn})$, in the axial phase propagation constant of the mode $\beta_{mn} = (2.\pi/\lambda)$ $n_{eff}(m, n)$, caused by small index change in the profile, is determined by the equation:

$$\delta(\beta_{mn}^2) \propto \int \delta(n^2) |E_{mn}|^2 \qquad \text{Eq 6:}$$

where:

m and n are radial and azimuthal mode number, $\delta(n^2)$=difference in the square of the refractive index of the fiber from that of the idealized index profile, $|E_{mn}|$=amplitude of the electric field of the mode, mn, and A=the idealized infinite cross sectional area of the fiber, whereby a judicious choice of the shape of the index discontinuity can be made so that $\delta(\beta_{mn}^2) \sim 0$ for all but the desired mode(s).

The Figures

FIGS. 1–4 are designed to show the effect of fiber design on probability of coupling for successive light modes traversing the fiber. Each of these figures is constituted of: a cross-sectional fiber profile on coordinates of index-of-refraction and radial dimension; together with a diagram of successive modes as spaced by values of effective index proportional to those experienced by those modes. The figures, accordingly, directly indicate $\Delta n_{eff}$ values, and thereby probability of mode conversion, for members of successive mode pairs of traversing light.

Profiles of FIGS. 1–4 are simplified to aid discussion. Details of the cladding are of relative insignificance regarding the inventive teaching, and all illustratively show the constant-index cladding now in general use in multimode fiber. Varying index claddings are, however, not discounted for implementation of the invention. While principles outlined are applicable to all core profiles—step as well as profiled—figures show the α=2 profiling, as required for EMF fiber. Depicted profiles are "idealized" in accordance with usual practice, and do not show unintended, but tolerated, features such as central dip, ripples and sloped "step" changes. All include at least a central core region of α=2 profile (defined as satisfied by "near-2 α profile" and/or "best-fit α profile"—see "Terminology").

FIG. 1 represents a state-of-the-art multimode fiber, constituted of an α=2 profile core 10 within cladding 11. Core index values range from a maximum of $n_{co}^{max}$, to a minimum of $n_{cl}$—equal to that of the encompassing cladding 11. Modal groups 12–13 are shown as evenly-spaced, indicating uniform $\Delta n_{eff}$ values and, accordingly, equal coupling probability for members of included mode pairs. The effective index difference between the highest order bound mode 13 and nearest-neighbor cladding mode 14, in this fiber, is always less than or equal to the index difference between members of pairs of bound modes 12–13, so that perturbation spacings that induce coupling between bound modes also induce coupling between the highest order bound mode and cladding mode 14. By the same token, coupling of any bound pair statistically precipitates progressive coupling—ultimately to cladding mode 14 with associated radiation loss. The invention addresses this loss mechanism.

Figure 2:
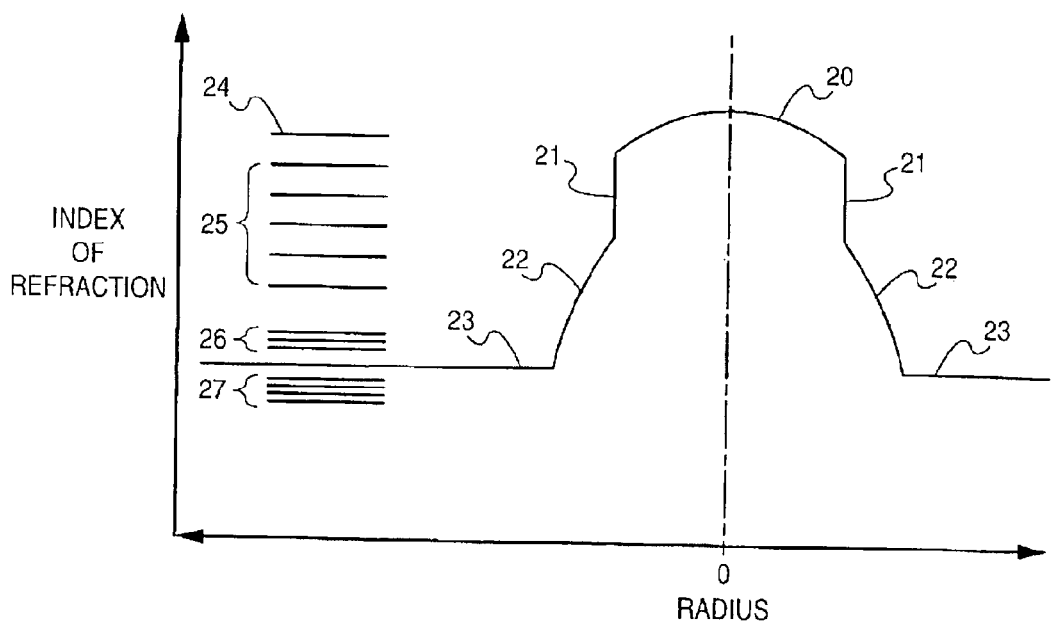

FIG. 2, the first EMF structure diagrammed, shows a core structure having a central portion, or "first core portion" 20 of α=2 profile, bounded by a "second core portion" 22. All values of index-of-refraction constituting portion 22 are lower than those prescribed by extrapolation of the first core portion profile. Portion 22, constituting a "discontinuity" in accordance with the invention, interfaces with portion 20 at step-change 21 (in turn constituted of an index-of-refraction change of at least 5% Δ occurring over a radial distance ≦2 μm). Portion 22, in this instance, takes the form of a second α profiled region, which, in turn, interfaces with constant-index cladding 23. Modal groupings depicted differ from those of FIG. 1 in one primary manner—whereas the fundamental mode 24, and the succeeding five modes 25, depicted, are spaced by equal $\Delta n_{eff}$ values, the $\Delta n_{eff}$ value associated with the highest bound mode grouping 26 is significantly larger. Accordingly, maximally-spaced perturbations, required for inducing coupling as among modes 24 and 25, do not induce coupling to mode 26. Mode 26 has been "decoupled". Assuming intentional fiber perturbations of axial spacing no smaller than sufficient to couple lower modes 24–25 (and statistically-significant lacking of unintended perturbations of closer spacing as required to satisfy coupling to the highest bound mode 26), the effect is to prevent coupling of modes 24–25 to cladding mode 27.

Thickened lines, representing broadened $n_{eff}$ values for mode groupings 26 and 27, indicate group splitting as induced by the discontinuity—separation of group members that were initially of the same $n_{eff}$. For optimal decoupling, the discontinuity should take account of splitting with sufficiently increased $\Delta n_{eff}$, to decouple all included members of grouping 26. The fiber profile of FIG. 2 causes relatively small mode splitting for given increased value of $\Delta n_{eff}$, and constitutes a preferred embodiment.

The profile of FIG. 3, again a Type A structure, is a variant on the FIG. 2 profile, in this instance, including a third core portion 34, of maximum index greater than that of discontinuity 32. Facilitating comparison with the earlier figure: both first core portion α=2 profile regions, 30 and 20; and core-core interfaces, 31 and 21, are of the same magnitude in the two figures. However, discontinuity 32, in this instance of constant index rather than profiled, is bounded by a third core portion—here shown as of α=2 profile region 34—interfacing with discontinuity 32 at 33. The core-cladding interface, of the FIG. 3 structure, is at the intercept of core portion 34 and cladding 35. Third core region 34, of maximum radial dimension, 30% of the total core (30% a)—is of inner index sufficient to define interface 33 and of outer index to define the core-cladding interface.

Mode spacings are generally unaffected by inclusion of third core portion 34, but for the few higher order modes that "see" the discontinuity. Accordingly, $\Delta n_{eff}$ values for modal groups 36–37, with field concentrations located within α=2 region 30, are near-equal with only minor evidence of splitting. The relatively pronounced discontinuity 32 is responsible for more severe splitting both of higher-order guided-mode group 38 and cladding-mode group 39. (It is proper to regard splitting of mode group 39 to have been sufficient for converting it to a cladding mode from the final bound mode 13 of a corresponding FIG. 1, prior art, α=2 fiber.)

Largely attributable to the large step-change 31, $\Delta n_{eff}$ for mode-pair 37–38 is sufficiently increased to accommodate members of the now-split grouping 38, while continuing to provide for differentiation over that for members of lower-order bound pairs. The desired "decoupling" of bound modes—in this instance, of modes 38–39—has been accomplished. Maximum perturbation spacing sufficient for coupling modes 36–37 does not induce radiation loss.

The position of the third core portion 34, and the radial extent of the second core portion 32, may be varied to control both the magnitude of the effective index change induced by the introduction of the second core portion and the degree of splitting of affected mode groupings. A third core portion, while optional for Type A structures, may become undesirable as index values defining the discontinuity closely approach that of the cladding.

Figure 3:
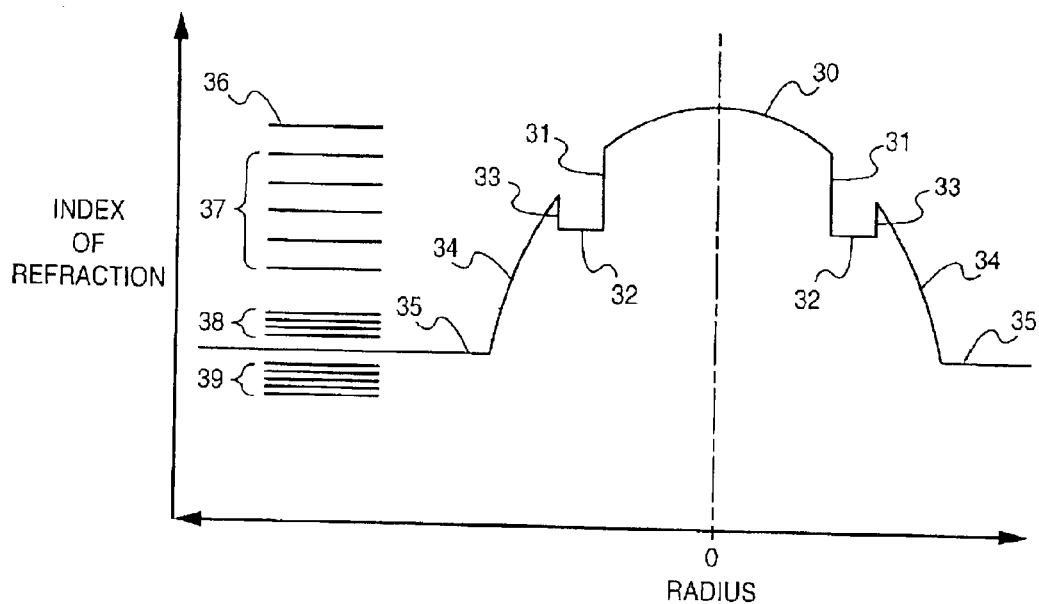
Figure 4:
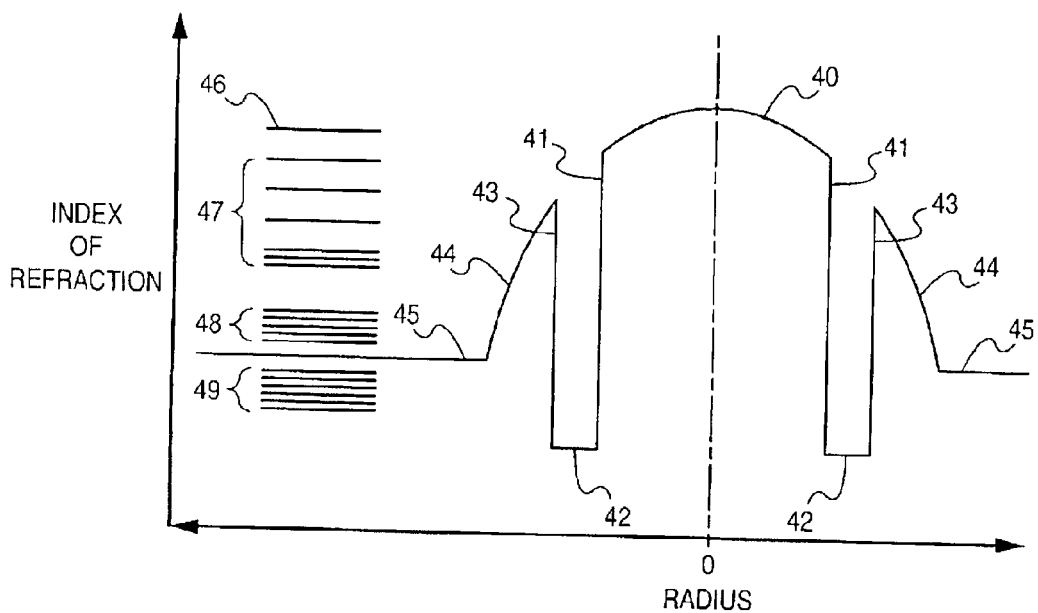

The Type B profile of FIG. 4 is of the same form as that of the preceding figure, with all numbered features 40–49 corresponding with features 30–39 of FIG. 3. The lowered index of discontinuity 42 (in fact, since lower than that of cladding 45, thereby qualifying it as Type B) is responsible for increased splitting of highest bound mode 48 and of cladding mode 49. As in FIGS. 2 and 3, with proper perturbation spacing, desired mode-mixing is maintained as among modal groups 46–47 (again equally spaced in effective index, albeit with some slightly increased splitting of lowest-order modes 47 due to minor influence of the still more pronounced discontinuity 42 on the tail of its energy spectrum). The third core portion 44, necessarily of index values greater than that of the cladding, is required in Type B structures for avoiding conversion of mode 48 to a cladding mode (and, thereby, defeating the inventive objective).

FIGS. 5–8 show commercial articles incorporating one or more enhanced multimode fibers.

Figure 5:
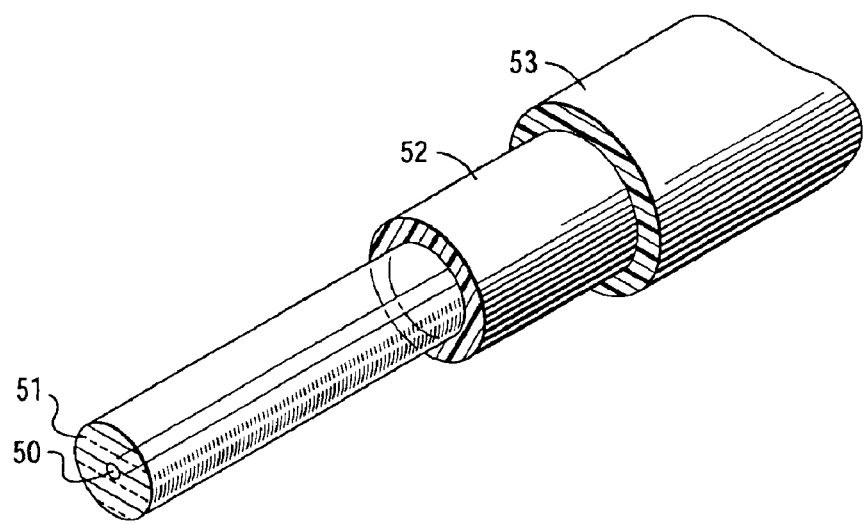
FIG. 5 is a perspective view of an EMF structure, dual-coated in accordance with conventional practice.

FIG. 5 is a perspective view of a dual coated, EMF, constituted of core 50 and cladding 51, together with primary and secondary coatings 52 and 53.

Figure 6:
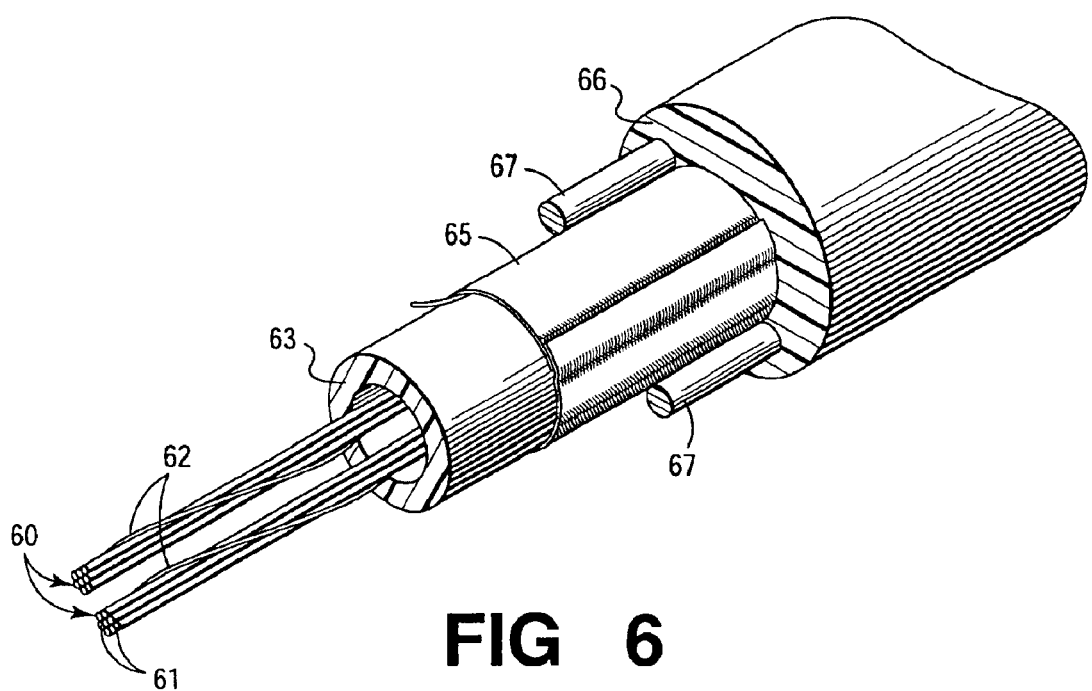
FIG. 6 is a perspective view of one form of cable structure containing grouped EMFs.

FIG. 6 depicts one form of commercial cable (described in AT&T Cable, Issue 9, December 1990). It is shown as containing two fiber bundles 60, each consisting of twelve color-coded fibers 61, held together by an encircling yarn 62. Individual fibers 61, of the general design of that of FIG. 5, may include a tertiary coating (not shown) for coding. The structure is completed by core tube 63, cable filling compound 64, water blocking tape 65, polyethylene jacket 66 reinforced by steel wires 67, a second water blocking tape 65, and finally by outer polyethylene jacket 66, which is reinforced by steel wires 67.

Figure 7:
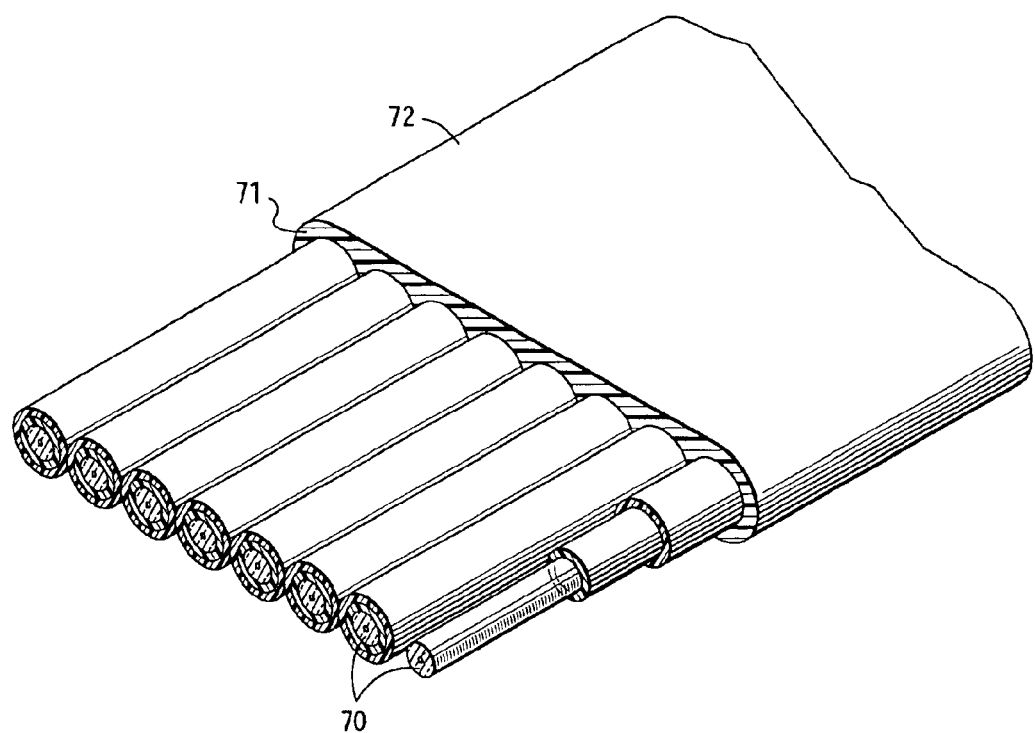
FIG. 7 is a perspective view of an array—an AccuRibbon® parallel array—in this instance, containing twelve such fibers.

FIG. 7 shows a commercially available parallel fiber array known as AccuRibbon®. The structure provides for 12 fibers 70, of the structure shown in FIG. 5, filler material 71, and sheathing 72.

Figure 8:
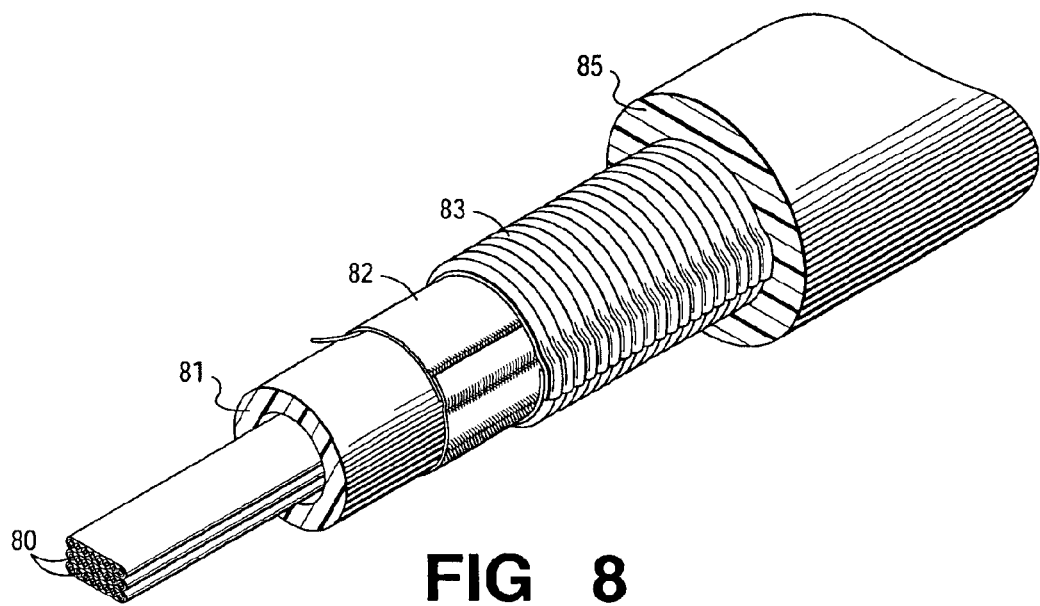
FIG. 8 is a perspective view of a cable containing many of the arrays of FIG. 7.

FIG. 8 shows a cable containing several planar arrays 80, each of the structure shown in FIG. 7, enclosed within cross-ply sheath 81, and provided with cable filling compound 82. The particular structure shown, an underwater armored cable, includes overwrappings constituting conductive shield 83, and bonded jacket 85.

Figure 9A:
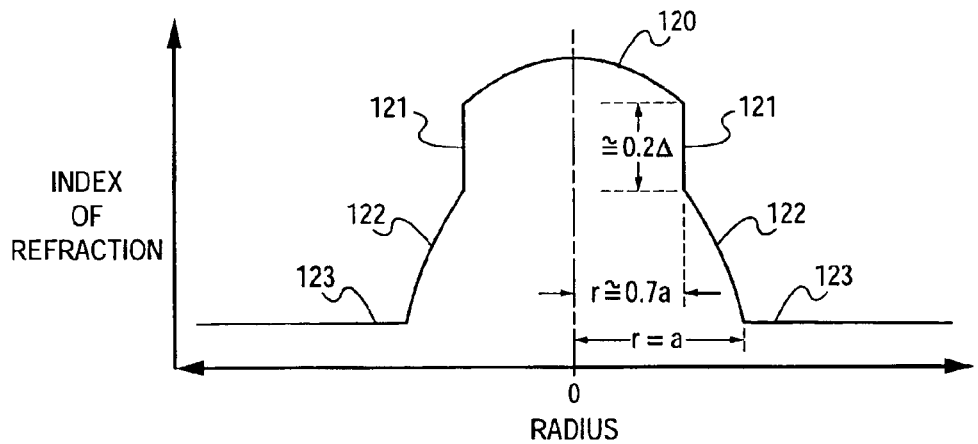
FIG. 9 depicts an EMF core profile (FIG. 9A) and corresponding, profile-determined light modes for traversing light (FIG. 9B).
Figure 9B:
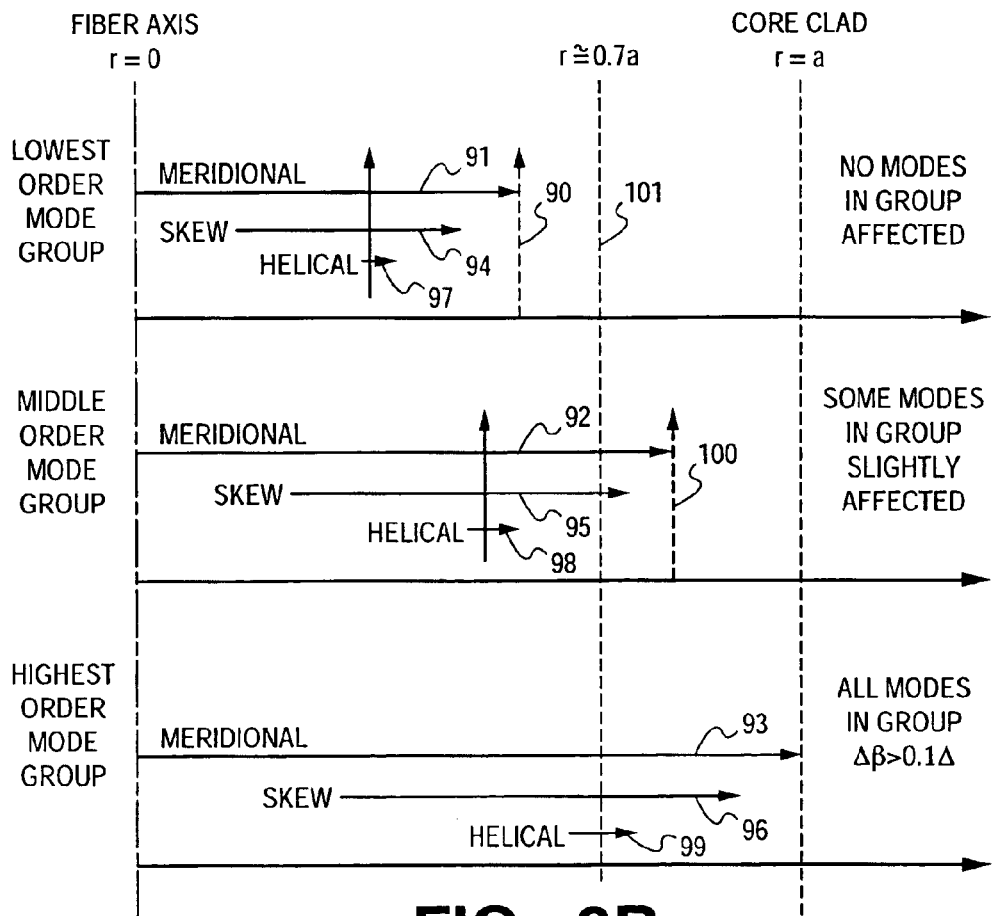

FIGS. 9A and 9B are basis for discussion of design considerations. Of general applicability to all EMF structures, specifics are in terms of a preferred embodiment—that shown in FIG. 2. FIG. 9A is a cross-sectional view of a FIG. 2 profile, on coordinates of index and radial position. FIG. 9B shows field location for different illustrative mode groups of the fiber.

It is well known that, a fiber core of α profile generally tends toward equalization of modal group velocities, and that, from that standpoint, it is optimized at an exponent value of 2. Accounting for likely-to-be-encountered deviations, from profile, as well as from exponent value, ranges for this nominal "α=2 profile", as required for the first EMF core portion, have been defined under "Terminology". The requirement is satisfied by conformance with both "Near-2 α Profile" and "Best Fit α Profile", as there defined.

Contemplated operation is within the wavelength spectrum including the 850 nm operation, common in multimode fiber systems, as well as the usual single-mode system wavelengths of 1310 nm and 1550 nm. "Normal" multimode operation is assumed, i.e., fiber dimensions supporting at least 50 modes—a requirement satisfied, in silica-based fiber of core radius of 15 $\mu$m–50 $\mu$m, e.g., 25 $\mu$m, for system wavelength of 850 nm. While the invention is not so limited, description is in terms of the silica-based fiber of usual overall diameter of approximately 125 $\mu$m, and of typical Δ of 1%.

As commonly used, the terminology "mode" or "modal group", referring to the spaced groupings for which $\Delta n_{eff}$ is computed, contemplates a "degenerate" mode grouping—a grouping of modes initially of the same axial group velocity. Degenerate groupings are constituted of three types of modes: meridional modes (including the fundamental mode, and, for higher order groupings, including the planar modes following paths parallel to that of the fundamental mode); helical modes; and skew modes—indicated on FIG. 9B as: meridional modes 91, 92 and 93; skew modes 94, 95 and 96; and helical modes 97, 98 and 99. Numbering order, in each instance, is: lower order mode group; middle order mode group; and highest order mode group. Relative lengths of lines representing the radial extent of the mode field or ray equivalent, are properly proportioned (with meridional mode fields extending from the fiber axis outwardly, longest; helical modes, occupying near-constant index regions, shortest; and skew modes, of intermediate length).

Step-change 121, the core-core interface between inner core region 120 and discontinuity 122, is shown on FIG. 9A as located at radial position r≅0.7a (at about $\frac{7}{10}$ of the core radius, a, as measured from the center of the core, and extending to the onset of cladding 123)—generally its preferred outermost position for equally affecting all modes of the highest order core mode group. While placement closer to the fiber axis is effective for decoupling of the highest core mode, it unnecessarily decouples lowest-order mode energy as well, and is less efficient.

Reference is made to FIG. 9B in discussion of proper placement of the discontinuity. As located, step-change 121, signaling commencement of discontinuity 122, is considered for its influence on three representative modal groupings—"lowest-order", "middle-order", and "highest-order". Each of the three groupings is shown as consisting of meridional, skew, and helical members: the lowest-order grouping consisting of members 91, 94, 97; the middle-order grouping consisting of members 92, 95, and 98; and the highest-order grouping consisting of members 93, 96, and 99. The lengths of the arrows representing the grouping members indicate relative field size, so that, in each instance, the meridional grouping is the largest—extending from the center of the fiber (r=0) to position 90, 100, or all the way to the core-cladding interface (at r=a). The highest-order grouping is most influenced by the discontinuity—with the discontinuity onset at r≅0.7a being located at the center of its helical member field. The influence of the discontinuity is less for the middle-order mode group, and least for the lowest-order mode group. (In terms of relative values depicted: only the meridional and skew members, of middle order modes have fields encroaching on the discontinuity region at all, with the major parts of both outside its influence; while the entirety of the lowest-order mode group, with all member fields spaced from the discontinuity, is uninfluenced.)

Accordingly, FIG. 9B depicts an arrangement for satisfying a primary objective—a major part of the field energy of the highest-bound mode group (93, 96, 99) is "captured", thereby having a major effect on its $\Delta n_{eff}$ value, while leaving $\Delta n_{eff}$ substantially unchanged for mode members of lower order bound mode groups. It is the present teaching that placement of the inner boundary of the discontinuity at or radially within position 101 (at r≦0.7a) is desirable for assuring an inventive objective of decoupling a bound-to-bound mode pair (rather than a bound-to-cladding pair), found required for effectively avoiding radiation loss. Placement of the onset of the discontinuity beyond the center of helical mode field 99, while indeed leaving $\Delta n_{eff}$ unchanged for a larger number of lower modes, results in less effective decoupling. Placement of the onset of the discontinuity precisely at r=0.7a is near-optimum for generally-encountered fiber designs and is preferred. The same considerations lead to a position range of 0.1a–0.8a.

Perturbation

Mode coupling is induced by longitudinally-located "perturbations"—interruptions in otherwise continuous fiber transmission properties as "seen" by a traveling light pulse, e.g., as changes in index-of-refraction. As discussed under "Fundamental Considerations", the probability of coupling for any given mode-pair is dependent on perturbation spacing—closer spacings being required to induce coupling of mode pairs of larger values of $\Delta n_{eff}$. Perturbations may be introduced unintentionally or intentionally—may be "natural" or "induced". While the invention assumes the latter, principles discussed are applicable to both types of perturbations.

Natural ("intrinsic") perturbations, e.g., due to particulate impurities or to deviations from prescribed fabrication conditions (such as irregularity of pull rates during drawing), favor larger spacings, which induce coupling only as between modes separated by smaller values of $\Delta n_{eff}$. Generally prescribed negative discontinuities of the teaching, since increasing $\Delta n_{eff}$ to greater values than those resulting from statistically prevalent spacings, interrupt coupling sequence initiated by such natural perturbations as well, so that associated loss from that source is lessened.

Induced perturbation spacings may now be reliably tailored to bring about wanted coupling between lowest-order bound modes without affecting highest order bound modes. Spacings (values of perturbation period), calculable from Equation 4 in "Fundamental Considerations", depend on fiber characteristics determinative of values of $\Delta n_{eff}$ for modes to be coupled. Spacings are generally within the range, 700–3000 µm; for studied designs, likely within the range, 900–1050 µm.

In either event—for either natural or induced perturbations—the result is to selectively "decouple" the outermost core mode(s), and thereby to avoid radiation loss of energy from modes with field concentration inside the inner boundary of the discontinuity (thereby substantially lessening the added loss previously associated with mode mixing).

Co-pending patent application Ser. No. 10/407,298 "Optical Fiber Fabrication And Product" is directed to an expedient method for fabrication of a perturbed lightguide offering the precision of perturbation period useful for effective coupling of selected mode pairs desired for implementation of the present teaching. Perturbed fiber of the co-pending application depends on a series of regularly spaced "geometric perturbations", each producing a small change in effective index-of-refraction along the lightguide. Effectiveness of small perturbations depends on repetition—in a sense on a "resonance" effect—inducing coupling, while avoiding associated scattering loss, which scales with perturbation size.

In accordance with that co-pending application, the needed train of repeating, precisely-spaced perturbations is generated by means of an acoustic wave, introduced into the fluid from which the lightguide is solidified—e.g., into the fluid draw region, between preform and fiber, from which fiber is drawn during fabrication. The method achieves reliable coupling with a stream of small geometric perturbations. A stream of at least 5 perturbations, of index change in the range of 0.001–0.01% $\Delta$, as measured at the operating wavelength (or "system wavelength", $\lambda_s$), is qualification for perturbations to accomplish coupling—e.g., $\lambda_{stripping}$—in implementation of the present invention.

Perturbations, satisfying claims of that co-pending application, are "axial perturbations" (consisting of successive fiber bends), or "size perturbations" (consisting of successive changes in cross-sectional area of the guide). Use of fiber fabricated in accordance with that co-pending application constitutes a preferred embodiment of this invention.

EXAMPLES

Examples have been selected from ongoing development work. One objective of this work is realization of a particular promise of mode mixing—that of permitted lessened value of fiber delta without the usually-associated increased loss. Achievement of the objective is shown by comparison of Examples 4–6 with Example 3. All examples measure insertion loss for a continuous wave (cw) laser-generated signal, launched into a fiber of ten meter length, by comparison of power measurements made at fiber input and output. Fibers of all Examples were produced by MCVD under the same processing conditions. All are perturbed, with perturbations induced at critical spacings to maximize mode mixing (Eq. 5).

Results for Examples 1–6 are summarized on the Table. Examples 1–3 are based on three prior-art fibers of differing design, all represented by the FIG. 1 core profile. Fibers used in Examples 4–6 are of the design of Example 3, but include EMF discontinuities of the forms shown in FIGS. 2–4, in that order.

The Table first reports basic fiber parameters, $\Delta$ and core radius; and in following columns, reports loss, critical perturbation period, and ratio of loss to that of unperturbed fiber. Calculated values based on theoretical period and theoretical loss are included. Data, showing improved fiber loss for EMF fibers of Examples 3–5, relative to the industry-preferred, Design 1 prior art fiber of Example 1, is significant.

Example 7 (conventional multimode design) and Example 8 (EMF design) compare fiber information capacity for unperturbed and perturbed fiber, otherwise of identical index profile. Each reports the improved information capacity associated with mode-mixing—capacity improvement that is a composite of any one or more of: increased per-channel bit capacity; decreased channel separation/WDM channel size; and broadened wavelength spectrum. Comparison of these examples, the first without discontinuity and the second with discontinuity, illustrates the inventive thrust—retention of performance advantages of mode-mixing without the associated added fiber loss.

Fiber used in all examples was of common commercial design—silica-based and of nominal outside diameter of 125 µm. While based on the best available experimental information, fiber samples used in the examples do not represent optimization. Further, while expediting comparison, advantages of EMF are equally applicable to fiber of other material—organic (plastic) as well as inorganic.

Test Procedure Used in the Examples

The fiber was placed on, and at varying angle to, a periodically deforming grid of 40 parallel, 800 µm-spaced, 800 µm-diameter, wires, in turn, supported by a smooth, rigid, planar, surface, and was deformed by an evenly distributed load applied along the 3.2 to 7.5 cm length of fiber spanning the wires. Laser beams—cw and of 0.01 mw power level—initially of 850 nm wavelength, finally of 1300 nm wavelength—were launched into the fiber in succession. Input and output power was measured with an optical power meter; and loss was calculated.

The measurement was repeated for different loadings and wire spacings. Grid spacings of from 800 µm to 1500 µm were achieved by inclining the fiber axis from a position orthogonal to the supporting wires by increments of 5°—enabling spacing increments of the order of 20 µm. Successive loadings were 2, 4, and 6 pounds, with resulting microbending—displacement of the fiber axis—by amount in the range 0.001–0.1 µm.

Loss measurements yielded the expected loss vs. period curve, showing minimal loss except over a range of periods corresponding to the critical coupling period, $\Lambda$, with deviation range of approximately 2–5% centered at this period. The magnitude of the loss, again as expected, was proportional to $\Lambda^6$ for any given load. Measured loss for all EMF fibers was improved over than that for (perturbed) Design 1 fiber.

Example 1

A conventional, Design 1 fiber, of the profile form shown in FIG. 1, has a Δ of 2% and a core radius of 31.25 μm. At the period of maximum loss, which occurs at Λ=1000 μm, the loss for 6 pounds load is 12.4 dB. Loss is less than 0.4 dB with a 50 μm increase or decrease in the period. Measured maximum loss period correlates well with the value of 990 μm predicted by Eq. 5.

Example 2

A conventional Design 2 fiber, of the profile of FIG. 1, has a delta of 1% and core radius of 25 μm. At the period of maximum loss, which occurs at Λ=1150 μm, the loss for 6 pounds load is 25 dB. Loss is less than 0.4 dB with increase or decrease of 50 μm in the period. This correlates well with the predicted location of the maximum loss at 1110 μm, from Eq. 5. The relative magnitude of the maximum loss ratio of Design 2 to Design 1 is 1.9, which is to be compared with a calculated value of 2.1.

Example 3

A conventional fiber, of the profile form shown in FIG. 1, has a core radius of 30 μm and a Δ value of 1.2%. Location and value of the maximum loss peak, are consistent with Eq. 5 prediction.

Example 4

An EMF fiber, of the profile form shown in FIG. 2, has a core radius of 30 μm, a Δ value of 1.2%, and an index discontinuity of 5% Δ, as measured at its inner bound, which is located at 0.7 of the core radius.

Referring to FIG. 2, it includes a first core portion 20 of α=2 profile. First core portion 20, including a central dip of radial dimension 3 μm (not shown in the figure), is of 21 μm radius. Significantly, from the standpoint of the quest for low Δ fiber, added loss was better than that for standard Design 1 fiber of Example 1, i.e., of 0.75 loss ratio (as compared with a predicted loss ratio of 3.6).

Example 5

A fiber of FIG. 3 profile has a core radius of 30 μm and a delta value of 1.2%. It includes an index discontinuity 32 of 3 μm radial extent, and of reduced index of 10% Δ at its inner bound located at 0.8 of the core radius. Its first core portion 30 is of α=2 profile and of 24 μm radius. Maximum added loss was 7.6 dB, which was 0.65 of that of standard Design 1 fiber (as compared with a predicted ratio of 3.6).

Example 6

A Type B fiber, of the profile shown in FIG. 4, has a core radius of 30 μm and a delta value of 1.2%, with an index discontinuity, located between 0.80 and 0.95 of the core radius. The magnitude of the discontinuity was −25% Δ as measured at its inner bound. Added loss (accompanying perturbation-induced mode-mixing) was 0.16 of that of the standard Design 1 fiber (as compared with a predicted ratio of 3.6).

All fibers of Examples 4–6, representing the three EMF fibers of FIGS. 2–4, show improved loss characteristics relative to the corresponding FIG. 1 fiber of Example 3. All three fibers were measured to have loss less than 3.5 dB/km at 850 nm.

Example 7

A 1-km long Design 1 fiber of FIG. 1 profile, with 6 lb. load, had a maximum loss period of ~980 μm, with perturbation-induced bandwidth improvement of 3-fold—from 200 to 600 MHz-km at 1300 nm wavelength, and from 100 to 300 MHz-km at 850 nm wavelength. Added loss, accompanying perturbation-induced mode-mixing, was approximately 4 dB at both wavelengths.

Example 8

The procedure of Example 7 was repeated using the EMF fiber of Example 6. Added loss resulting upon loading was <0.5 dB at the loss peak (as well as at all other grid spacings at which measurement was made). The same 3-fold bandwidth improvement accompanying mode-mixing was realized—from 200 to 600 MHz-km at 1300 nm wavelength, and from 100 to 300 MHz-km at 850 nm wavelength.

TABLE

| Fiber Design | Core Δ (%) | Core radius (μm) | Max loss @6 lbs (dB) | Theoretical period at max loss (μm) | Measured Period at max loss (μm) | Theoretical Loss ratio to Design 1 | Measured Loss Ratio to design 1 | Loss Ratio Compared with Conventional MM design |
|---|---|---|---|---|---|---|---|---|
| Example 1 Conventional MM - Design 1 | 2 | 31.25 | 12.6 | 990 | 1000 | 1 | 1 | 1 |
| Example 2 Conventional MM - Design 2 | 1 | 25.00 | 24.8 | 1110 | 1150 | 2.1 | 1.9 | 1 |
| Example 3 Conventional MM - | 1.2 | 30.00 | 48 | 1210 | 1200 | 3.6 | >3 | 1 |
| Example 4 - EMF | 1.2 | 30.00 | 9 | 1210 | 1200 | 3.6 | 0.75 | 0.21 |
| Example 5 - EMF | 1.2 | 30.00 | 7.6 | 1210 | 1200 | 3.6 | 0.65 | 0.18 |
| Example 6 - EMF | 1.2 | 30.00 | 2.0 | 1210 | 1200 | 3.6 | 0.16 | 0.04 |

On the basis of unperturbed fibers, otherwise of designs considered similar to the perturbed fibers on which measurements were made, bandwidths of fibers measured are viewed as comparable with those of typical commercial multimode fiber—from 100 to 500 MHz-km.

What is claimed is:

1. Article comprising at least one optical fiber suitable for multimode operation at a system operating wavelength in the wavelength range of 800–1700 nm, the fiber including a core of radius "a" and a cladding and having a guide strength, "Δ", the core including a first core portion having a continuous α relationship between value of refractive index and radial position such that the maximum change in index over a radial distance of 2 μm is less than 5% Δ, with all wavelength-dependent values determined at a wavelength of 850 nm as measured in free space, in which all radius-dependent values of index of refraction disregard deviations extending radially for distance of less than 850 nm, and in which the said fiber includes a plurality of spaced perturbations, each perturbation constituting an interruption in fiber transmission properties for at least one bound mode in the core,

CHARACTERIZED IN THAT the first core portion is enclosed within an annular, alpha-profiled second core portion, of radial dimension, 20–50% a, within which values of index of refraction are at least 5% Δ less than extrapolated values prescribed by extension of the said continuous relationship, and in that the said first core portion is of radial dimension 50–80% a, and wherein said first and second core portions have a discontinuous interface therebetween.

2. Article of claim 1 in which Δ is within the range of 0.7–4.0%, core radius is in the range 15–50 μm, and in which the index-of-refraction at the interface of the first core portion and the second core portion is reduced in value by at least 5% Δ over a radial distance ≦2 μm.

3. Article of claim 2 in which the minimum value of index in the said second portion is greater than the predominant value of index, $n_{cl}$, in the cladding.

4. Article of claim 3 in which the core-cladding interface is formed between the second core portion and the cladding.

5. Article of claim 2 in which the second core portion is enclosed within a third core portion of greater index than that of the second core portion as measured at its interface with the first core portion, the third core portion having a maximum radial dimension of 30% a and constituting the remainder of the core.

6. Article of claim 5 in which the minimum value of index attained in the said second portion is equal to or less than the predominant value of index, $n_{cl}$, attained in the cladding.

7. Article of claim 2 in which the said first core portion has a best fit alpha refractive index profile at the said operating wavelength in accordance with the relationship $$n^2(r)=(n_{co}^{max})^2 \cdot (1-2\Delta \cdot (r/a)^\alpha)$$

in which:

r=radial distance from the fiber axis n(r)=refractive index at r $\Delta=(n_{co}^{max}-n_{cl})/n_{co}^{max}$ $n_{cl}$ =the predominant refractive index of the cladding $n_{co}^{max}$ =the maximum refractive index of the core a=core radius, and in which α is of numerical value within the range 1.5–3.0.

8. Article of claim 2 in which the said fiber includes a plurality of uniformly spaced such perturbations.

9. Article of claim 8 in which the said perturbations comprise change in material index-of-refraction of value within the range, 0.1–5.0% Δ

10. Article of claim 8 in which the said perturbations comprise change in a cross sectional radial fiber dimension of at least 0.001 μm.

11. Article of claim 8 in which the said perturbations comprise change in cross sectional shape.

12. Article of claim 8 in which the said perturbations comprise change in axial fiber direction.

13. Article of claim 2 in which the fiber is encompassed within dual coatings including a primary coating in direct contact with the fiber and a secondary coating about the primary coating.

14. Article of claim 2 including a plurality of optical fibers within a sheathing, so defining a cable.

15. Article of claim 14 including grouped fibers.

16. Article of claim 15 in which grouped fibers are planar arrays.

17. Article of claim 2 in which the numerical value of the parameter, $\Gamma \geqq 0.0064$, where:

$$\Gamma=\{(2\Delta)^{0.5}/a\}$$

in which:

a=core radius $\Delta=(n_{co}^{max}-n_{cl})/n_{co}^{max}$ where: $n_{co}^{max}$=maximum refractive index in the core $n_{cl}$=predominant cladding refractive index of the cladding.

18. Article of claim 2 comprising reeled product.

* * * * *